United States Patent [19]
Lambert, Jr.

[11] 3,921,829
[45] Nov. 25, 1975

[54] HORIZONTAL ROTARY SWEEPS FOR FEED STORAGE TANKS

[75] Inventor: Charles F. Lambert, Jr., Louisville, Ky.

[73] Assignee: Clayton & Lambert Manufacturing Co., Buckner, Ky.

[22] Filed: July 24, 1974

[21] Appl. No.: 491,364

[52] U.S. Cl. .......................... 214/17 CB; 214/17 DB
[51] Int. Cl.² .................... B65G 65/32; B65G 65/38
[58] Field of Search ...... 214/17 CB, 17 DB; 302/56; 222/404, 405

[56] References Cited
UNITED STATES PATENTS

| | | | |
|---|---|---|---|
| 3,075,657 | 1/1963 | Hazen | 214/17 CB X |
| 3,297,177 | 1/1967 | Zeiter | 214/17 DB |
| 3,438,517 | 4/1969 | Steffen | 214/17 CB X |
| 3,524,557 | 8/1970 | Bakker | 214/17 CB X |

Primary Examiner—Robert G. Sheridan
Attorney, Agent, or Firm—Arthur F. Robert

[57] ABSTRACT

A horizontal rotary sweep, having a reversible horizontal radius-auger and being conventionally mountable in a silo on vertically movable means including a ring gear, is arranged for reversible tracking rotation about the ring gear's vertical axis so that the opposite sides of the auger can function as spreading and unloading sides respectively.

During the silo-filling/sweep-rising operation, the main drive motor rotates the horizontal auger about its long horizontal axis in the one direction necessary to cause its lower half to move the incoming silage (fibrous or particulate) toward and outwardly along the spreading side of the auger while the tracking motor rotates the rotary sweep about the vertical axis of the ring gear in the one direction necessary to cause the spreading side of the horizontal auger to advance.

During the silo-unloading/sweep-lowering operation, the main drive motor rotates the horizontal sweep auger about its long horizontal axis in the opposite direction to cause its lower half to move the unloading silage toward and inwardly along the unloading side of the auger while the tracking motor rotates the rotary sweep about the vertical axis of the ring gear in the opposite direction causing the unloading side of the sweep auger to advance.

1 Claim, 3 Drawing Figures

U.S. Patent    Nov. 25, 1975    3,921,829
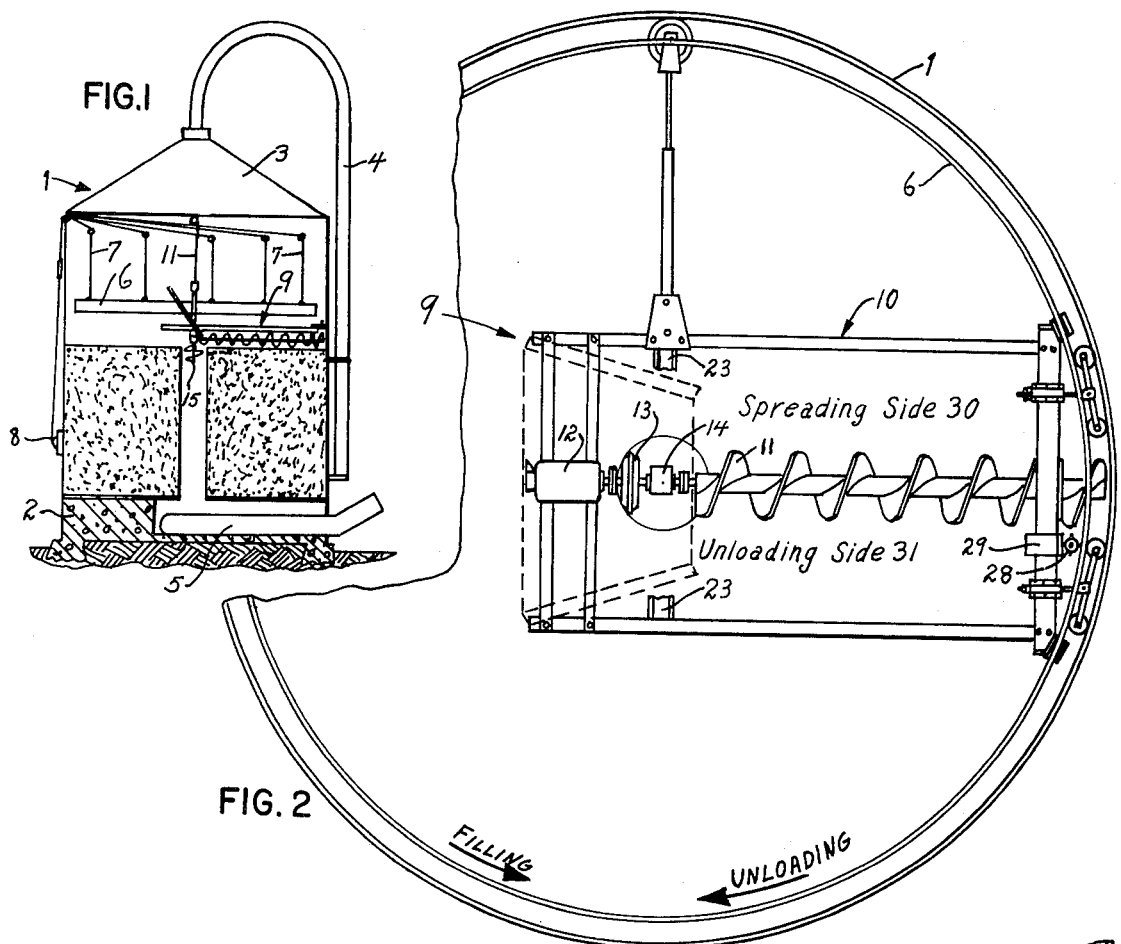
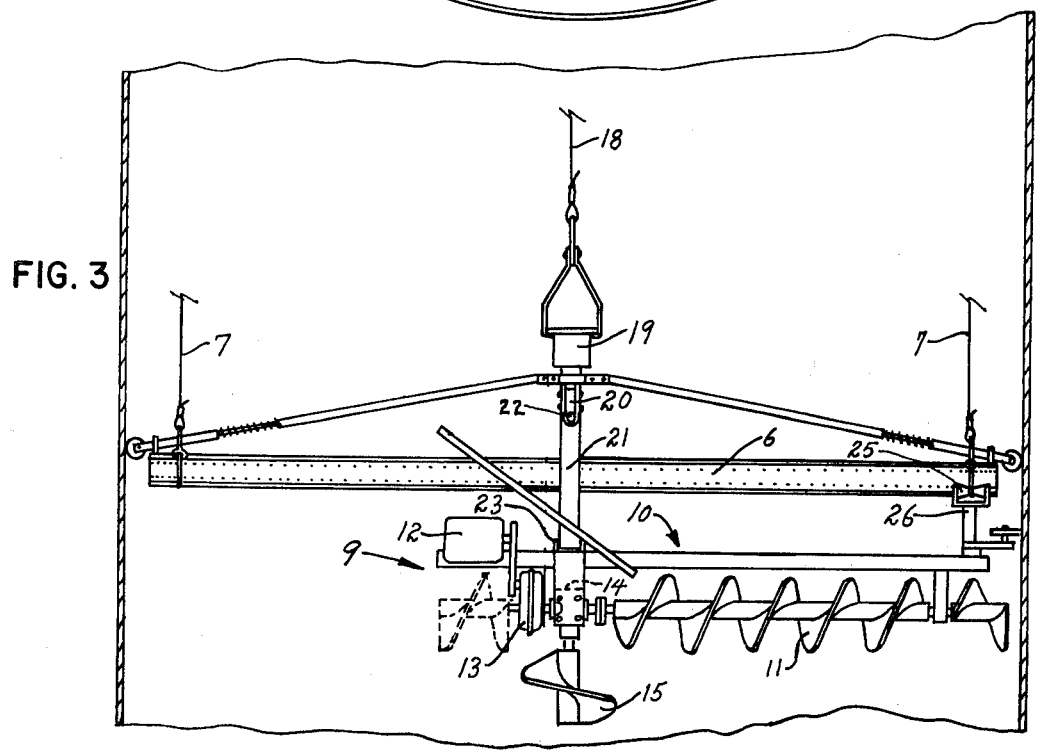

HORIZONTAL ROTARY SWEEPS FOR FEED STORAGE TANKS

CROSS REFERENCE TO RELATED APPLICATION

My co-pending applications, Ser. Nos. 416,680, 425,308 and 476,424 filed Nov. 16, 1973, Dec. 17, 1973 and Apr. 25, 1974, respectively, disclose but do not claim the reverse sweep subject matter of this application.

BACKGROUND OF THE INVENTION

1. Field of the Invention

This invention relates to horizontal rotary sweeps of the spreading/unloading conveyor type, which are used in cylindrical feed-storage tanks, such as silos and the like. They are herein designated as HR sweeps of the S/U type.

2. Description of the Prior Art

Unidirectional HR sweeps of the S/U type are commonly used in feed-storage tanks: during a silo-filling operation, to cross-sectional incoming silage more or less uniformly throughout the crosssectional area of the tank and contemporaneously form a silage discharge hole centrally through the rising column of silage; and, during a silo-unloading operation, to remove silage from the top of the stored column and direct it inwardly toward and downwardly into said discharge hole.

It is old to mount a unidirectional HR sweep of the S/U type in a silo on vertically movable ring-gear/cable means for horizontal sweeping or tracking rotation about the vertical axis of the ring gear and to provide the sweep with a center holeformer. In such sweeps, it is conventional: (1) to use horizontal conveyor means (i.e. horizontal flight conveyors or single or double conveying augers) which extend wholly (or partially) across either the radius of the tank or its diameter; (2) to rotate the horizontal auger means one way about its long horizontal axis during the silo-filling silage-spreading operation; (3) to rotate the horizontal auger means the same way in some cases and reversely in others during the silage-unloading operation; and (4) to effect the manual removal of a closed holeformer, or open a closable hole-former, between filling and unloading operations so as to expose the discharge hole for unloading purposes. See U.S. Pats. to Hazen No. 3,075,657 granted Jan. 29, 1963 and Zeiter No. 3,297,177 granted Jan. 10, 1967.

In operation, a unidirectional sweep performs one of its spreading/unloading operations efficiently, the other inefficiently, which is objectionable. To avoid this objection, reversible double or single augers are often flanked on their inefficient sides by parallel sideboards or aprons such as Zeiter's sideboards 102. Sometimes, between operations, reversible double augers (or a reversible single auger and a parallel apron) are positionally interchanged so that each replaces the other. See Lusk U.S. Pat. No. 3,368,703 granted Feb. 13, 1968. These arrangements increase the weight and complexity of the sweep.

My aforesaid co-pending applications Ser. Nos. 416,680, 425,308 and 476,424 all disclose reversible HR sweeps of the S/U type having single reversible augers extending across the radius of the tank with hole-formers in the form of either a fully exposed depending auger or an open-ended depending sleeve with or without a depending auger within it. None of them claim a reversible sweep.

SUMMARY OF THE INVENTION

Objects Of The Invention

The principal objects of the present invention are: to simplify HR sweeps of the S/U type without sacrificing strength or sturdiness and, through simplification, minimize the weight and the cost of manufacturing, assembling, installing, operating and maintaining the sweep.

Another important object is to achieve the foregoing objects in a sweep which performs both of its (spreading and unloading) operations rapidly and most efficiently.

Statement Of The Invention

The maximum achievement of the objects of the present invention is made possible by providing an HR sweep of the S/U type with a single reversible horizontal conveyor and arranging the sweep for reversible tracking rotation about the ring gear's vertical axis so that the spreading side of the conveyor advances during the filling operation while the unloading side advances during the unloading operation. As a result, each side of the S/U conveyor operates efficiently even when its silage spreading/ unloading speeds are maximized.

BRIEF DESCRIPTION OF THE DRAWINGS

The invention is illustrated in the accompanying drawings wherein: rotation

FIG. 1 is a somewhat schematic vertical section through a cylindrical feed storage tank or silo, which contains a column of silage and which is equipped with an HR sweep of the S/U type embodying my invention, this view omitting the auger drive means;

FIG. 2 is a horizontal section fragmentarily showing both the outer wall of the tank and the corresponding portion of the ring gear and also somewhat schematically showing my HR sweep of FIG. 1 in top plan, this view showing a diverter board in dotted lines; and FIG. 3 is a vertical section showing one half of both the cylindrical wall of the tank and the annular ring gear and also showing the HR sweep in side elevation.

DESCRIPTION OF THE PREFERRED EMBODIMENT

Conventional Structure

FIGS. 1-3 somewhat schematically illustrate: a tank; a circular ring gear; a conventionally constructed HR sweep of the S/U type in which my invention is incorporated; sweep support means; and tracking rotation drive means.

The cylindrical feed storage tank or silo 1 has a base 2, a top 3, a silage inlet pipe 4 which directs silage downwardly through the top of the tank 1 and a discharge conveyor 5 in the base 2. The circular ring gear 6 is supported within the tank by vertically-movable cables 7, which are connected to an outside winch 8 for gear raising and lowering purposes.

The HR sweep 9 may be of any conventional character comprising: a horizontal frame having a length ranging from the radius to the diameter of the tank; a frame-mounted motorized silage-moving flight or auger conveyor of diametric, radius or intermediate length; and a hole-former of any suitable character. The specific sweep 9 illustrated, conventionally includes: a horizontal sweep frame 10 of intermediate length; a horizontally-extending frame-mounted auger conveyor 11 of about radius length reversibly motorized through motor 12, gear-reducer 13 and gear box 14 for spreading and unloading purposes; and a hole-former in the form of a single vertically-disposed rotary auger 15 firmly mounted to depend from gear box 14 and rotationally connected through the gears of box 14 to the reversible drive motor 12.

The sweep 9 is supported at the opposite inner and outer end portions of its frame 10 for vertical raising and lowering movement with the ring gear and for tracking rotation about the ring gear.

The inner end of the HR sweep 9 is rotationally suspended from a centrally-disposed vertically-movable main suspension cable 18, which is connected to winch 8 to move vertically with the cables 7 of the ring gear 6. The inner axially-disposed end of cable 18 is connected to suspend the inner end of sweep 9 through a central structure comprising: an electrical collector ring assembly composed of an outer stationary part 19 supported by cable 18 and an inner rotary part 20 depending from within and supported by outer part 19; and a rectangular window-like frame 21 having its upper horizontal member 22 centrally connected to the lower end of the inner rotary part 20 and its lower horizontal member 23 transversely bridging and rigidly secured to the frame 10 of the HR sweep 9.

The outer end of the HR sweep 9 is rotationally suspended from the lower flange of the ring gear 6, at each of a pair of laterally spaced points, by a pair of inner and outer flangeengaging rollers 25 mounted on a vertically-depending fork-shaped support 26, the lower end of which is rigidly connected to sweep frame 10.

The sweep frame 10 carries a tracking gear 28 in tracking engagement with the ring gear 6 and a motor 29 for driving the tracking gear 28 to effect the tracking rotation of the sweep about the vertical axis of the ring gear.

Conventional Operation

In conventional operation, the HR sweep 9 would unidirectionally rotate in horizontal sweep fashion at a slow speed of 1/5th to 1/10th rpm while being winched upward during each filling operation for spreading purposes and downward during each unloading operation for stock-feeding purposes while the horizontal and vertical augers 11 and 15 rotate about their respective long axes in one direction during filling and in the other direction during unloading, each at a speed of about 150 rpm although the vertical auger 15 may be stationary during filling.

Inventive Feature

In accordance with my invention, the tracking motor 29 is made reversible and its operation correlated with that of the long auger drive motor 12 so that both motors cooperate as follows: during filling, the drive motor 12 rotates the horizontal auger 11 about its long horizontal axis in the one direction necessary to cause its lower half to move the incoming silage toward and outwardly along the spreading side 30 of auger 11 while the tracking motor 29 rotates the rotary sweep 9 about the vertical axis of the ring gear 6 in the one direction necessary to cause the spreading side 30 of the horizontal auger 11 to advance; and, during unloading, the drive motor 12 reversely rotates the horizontal sweep auger about its long horizontal axis so as to cause its lower half to move the unloading silage toward and inwardly along the unloading side 31 of auger 11 while the tracking motor 29 reversely rotates the rotary sweep 9 about the vertical axis of the ring gear 6 so as to cause the unloading side 31 of the sweep auger to advance.

In other words, my spreading/unloading apparatus, which is intended for use in filling silage into and unloading it from a silo 1 containing a vertically movable nonrotatable supporting assembly 6–8 which has a vertical center axis, comprises: A. a rotary sweep 9 mounted on assembly 6–8 for vertical raising and lowering movement therewith during respective silo filling and unloading operations, said sweep 9 having opposite outer spreading and unloading sides; B. a single sweep auger 11 mounted on said sweep 9 to extend from the vicinity of said center axis to the vicinity of a vertical cylindrical wall of said silo, said auger 11 having corresponding outer spreading and unloading sides 30, 31 and being operative to engage the top face of a column of silage during both spreading and unloading; C. a reversibly motorized drive means, including reversible tracking motor 29, for positively rotating said rotary sweep 9 slowly about said vertical center axis in one direction, during filling, with its outer spreading side foremost, and, in the opposite direction, during unloading, with its opposite outer unloading side foremost; and D. reversibly motorized drive means, including reversible drive motor 12, for positively rotating said sweep auger 11 rapidly about its long axis with its lower half moving forwardly in one direction toward its foremost spreading side 30 during filling and moving forwardly in the opposite direction toward its foremost unloading side 31 during unloading.

While I have described my invention as applied to the rotary sweep disclosed in my application Ser. No. 416,680, it will be understood that it is equally applicable to other rotary sweeps particularly including those disclosed in my earlier filed applications Ser. Nos. 425,308 and 476,424. It will be appreciated that my invention makes it unnecessary to use sideboards (or rails) or more than one auger thus simplifies the structure of the rotary sweep and correspondingly reduces its weight without sacrificing its strength and sturdiness. Additionally, it makes it possible to perform the loading and unloading operations at maximum efficiency.

Having described my invention, I claim:

1. A spreading/unloading apparatus for use in filling a material, such as silage, into and unloading it from a given cylindrical feed storage tank or silo containing a vertically movable nonrotatable supporting assembly, which has a vertical center axis, comprising:
    A. a rotary sweep mounted on said assembly for vertical raising and lowering movement therewith during respective silo filling and unloading operations,
       1. said sweep having opposite outer spreading and unloading sides;
    B. a single sweep auger mounted on said sweep to extend from the vicinity of said center axis to the vicinity of a vertical cylindrical wall of said silo,
       1. said auger having corresponding outer spreading and unloading sides, and
       2. said auger being operative to engage the top face of a column of silage during both spreading and unloading;
    C. reversibly motorized sweep drive means 1. for positively rotating said rotary sweep slowly about said vertical center axis
   a. in one direction during filling with its outer spreading side foremost, and
   b. in the opposite direction during unloading with its opposite outer unloading side foremost; and
D. reversibly motorized auger drive means
   1. for positively rotating said sweep auger rapidly about its long axis with its lower half
      a. moving forwardly in one direction toward its foremost spreading side during filling and
      b. moving forwardly in the opposite direction toward its foremost unloading side during unloading.

* * * * *